(12) United States Patent
Quiet et al.

(10) Patent No.: US 9,680,579 B2
(45) Date of Patent: Jun. 13, 2017

(54) DYNAMICALLY ADAPTIVE FREQUENCY ADJUSTMENTS

(75) Inventors: Duane Quiet, Hillsboro, OR (US); Harry Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 13/820,711

(22) PCT Filed: Mar. 28, 2012

(86) PCT No.: PCT/US2012/030973
§ 371 (c)(1),
(2), (4) Date: Aug. 11, 2015

(87) PCT Pub. No.: WO2013/147768
PCT Pub. Date: Oct. 3, 2013

(65) Prior Publication Data
US 2015/0365179 A1  Dec. 17, 2015

(51) Int. Cl.
H04B 15/00  (2006.01)
H04B 15/04  (2006.01)
H04B 1/38  (2015.01)

(52) U.S. Cl.
CPC .............. *H04B 15/04* (2013.01); *H04B 1/38* (2013.01)

(58) Field of Classification Search
CPC ........... H04L 27/2657; H04L 2027/003; H04L 2027/0065; H04L 27/2332; H04L 27/0014; H04L 27/2647; H04L 1/20; H04B 1/1027; H04B 1/123; H04B 1/1036
USPC ................. 375/259–285, 316–352, 354–376
See application file for complete search history.

(56) References Cited

U.S. PATENT DOCUMENTS

| | | | |
|---|---|---|---|
| 7,545,868 B2* | 6/2009 | Kennedy | H04B 1/7163 375/222 |
| 7,818,030 B2 | 10/2010 | Kawamoto | |
| 7,865,751 B2* | 1/2011 | Monferrer | H01L 23/34 713/300 |
| 8,842,714 B2* | 9/2014 | Kim | H03L 7/00 375/144 |
| 2007/0014556 A1* | 1/2007 | Persson | H04B 1/3833 396/57 |
| 2007/0249315 A1 | 10/2007 | Sorensen et al. | |
| 2008/0107188 A1* | 5/2008 | Kennedy | H04B 1/7163 375/259 |

(Continued)

FOREIGN PATENT DOCUMENTS

CN  101917603 A  12/2010

OTHER PUBLICATIONS

International Preliminary Report on Patentability received for PCT Patent Application No. PCT/US2012/030973, mailed on Oct. 9, 2014, 6 pages.

(Continued)

*Primary Examiner* — James M Perez
(74) *Attorney, Agent, or Firm* — Jordan IP Law, LLC

(57) ABSTRACT

Systems and methods may provide for implementing dynamically adaptive frequency adjustment. In one example, the method may include analyzing a first set of transmission information and a second set of transmission information based on a likelihood of transmission interference, and determining a dynamically adapted camera frequency, wherein the dynamically adapted camera frequency is to minimize the transmission interference.

22 Claims, 2 Drawing Sheets

(56) References Cited

U.S. PATENT DOCUMENTS

| | | | |
|---|---|---|---|
| 2010/0197363 A1 | 8/2010 | Sorenson et al. | |
| 2010/0329247 A1* | 12/2010 | Kennedy | H04B 1/7163 370/389 |
| 2011/0136475 A1 | 6/2011 | Jung | |
| 2013/0235906 A1* | 9/2013 | Kim | H03L 7/00 375/144 |
| 2016/0094849 A1* | 3/2016 | Burr | G06F 1/206 375/240.02 |
| 2016/0327779 A1* | 11/2016 | Hillman | G02B 21/367 |
| 2016/0364900 A1* | 12/2016 | Seiler | G06T 15/04 |

OTHER PUBLICATIONS

International Search Report and Written Opinion for PCT Application PCT/US2012/030973, mailed on Jul. 30, 2012, 9 pages.
Notice of Allowance for Chinese Patent Application No. 201280071864.1, mailed on Sep. 20, 2016, 4 pages including 2 pages of English Translation.

* cited by examiner

DYNAMICALLY ADAPTIVE FREQUENCY ADJUSTMENTS

This application is a National Stage of PCT/US2012/030973, filed on Mar. 28, 2012, entitled "DYNAMICALLY ADAPTIVE FREQUENCY ADJUSTMENTS.

BACKGROUND

Technical Field

Embodiments generally relate to mitigating harmonics amongst radio transmitter devices. More particularly, embodiments relate to using radio band information to dynamically change clock and data frequencies to reduce radio band interference.

Discussion

Modern consumer electronic devices may utilize more than one radio transceiver. For example, a laptop may utilize multiple transceivers for various communication protocols (e.g., Wi-Fi, Bluetooth, etc.), which may transmit signals in dedicated radio bands (i.e., radio frequencies). The laptop may also include a camera device, wherein the camera device may also be configured to transmit signals in a particular frequency. Situating a transceiver near a camera device may increase radio interference.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
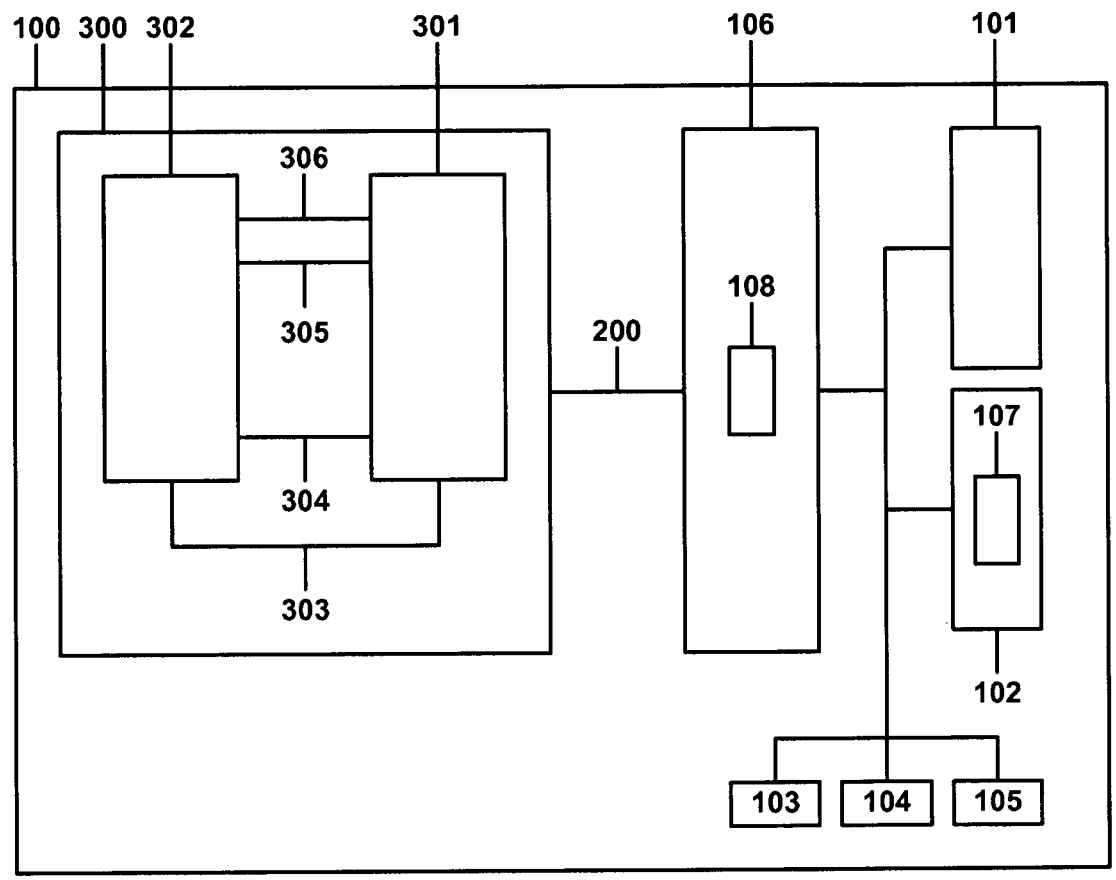
FIG. 1 is a block diagram of an example of a computing system for implementing dynamically adaptive frequency adjustment in accordance with an embodiment of the invention.

Turning now to FIG. 1, a block diagram of a user device 100 for implementing dynamically adaptive frequency adjustment is shown. The user device 100 may be, among other things, any programmable machine that may carry out a sequence of logical operations. Examples of the user device 100 may include, for example, a notebook computer, desktop computer, personal digital assistant (PDA), media player, a mobile Internet device (MID), any smart device such as a smart phone, smart tablet, smart TV, or the like. In this embodiment, the user device 100 may be a notebook computer. The user device 100 may include, for example, a user device processing component 101, a user device memory component 102, a user device first transceiver 103, a user device second transceiver 104, a user device third transceiver 105, a frequency adjustment component 106, and a camera device 300. The frequency adjustment component 106 and the camera device 300 may be coupled by an interconnect 200.

The user device processor 101 may include at least one computer processor that may be utilized to execute computer-readable executable instructions. For example, as will be discussed in greater detail, the user device processor 101 may be configured to execute various software applications relating to dynamically adaptive frequency adjustment.

The user device memory component 102 may be any device configured to store data. In this example, the user device memory component 102 may store, among other things, user device operational information 107. The user device operational information 107 may include any information relating to operations of the user device 100. The user device operational information 107 may include information pertaining to the user device first transceiver 103, the user device second transceiver 104, the user device third transceiver 105, and the camera device 300. Examples of the user device operational information 107 may include, for example, transmission frequency information, timing information, transceiver settings information, camera setting information, or the like. As will be discussed in greater detail, the user device operational information 107 may be used to, among other things, dynamically adjust frequencies in the user device 100 in an adaptive manner to minimize interference.

The user device first transceiver 103, the user device second transceiver 104, the user device third transceiver 105 may be transmitter/receiver devices that enable the user device 100 to communicate wirelessly. The user device first transceiver 103 may be configured to communicate wirelessly via Wi-Fi (e.g., LAN/MAN Wireless LANS (Wi-Fi), IEEE 802.16-2004). The user device second transceiver 104 may be configured to communicate wirelessly via Bluetooth (e.g., IEEE 802.15.1-2005, Wireless Personal Area Networks). The user device third transceiver 105 may be configured to communicate wirelessly via a cellular telephone connection (e.g., W-CDMA (UMTS), CDMA2000 (IS-856/IS-2000), etc.). In other embodiments, the user device first transceiver 103, the user device second transceiver 104, and the user device third transceiver 105 may be configured to communicate wirelessly via various other wireless communication protocols, such as IEEE 802.16-2004, LAN/MAN Broadband Wireless LANS (WiMAX), Zigbee (IEEE 802.15.4), etc., depending upon the circumstances.

The frequency adjustment component 106 may be a component configured to, among other things, implement a dynamically adaptive frequency algorithm 108. As will be discussed in greater detail, the dynamically adaptive frequency algorithm 108 may be configured to, among other things, receive and analyze transmission information, determine a dynamically adapted camera frequency configured to minimize interference in operating radio devices, and transmit an instruction signal to direct a camera device to transmit based on the dynamically adapted camera frequency.

In particular, in this example, the frequency adjustment component 106 may be configured to receive the user device operational information 107, and determine the radio bands that the user device first transceiver 103, the user device second transceiver 104, the user device third transceiver 105 may be transmitting on, and the frequency that the camera device 300 may be utilizing. The frequency adjustment component 106 may then utilize the dynamically adaptive frequency algorithm 108 to analyze this information based on a likelihood of transmission interference. In particular, the frequency adjustment component 106 may determine that if the transmission band that the camera device 300 is operating on is not adjusted, this may result in interference in the transmission operation of one of the three transceiver devices.

Upon determining a likelihood of transmission interference, the frequency adjustment component 106 may utilize the dynamically adaptive frequency algorithm 108 to determine the dynamically adapted camera frequency. The dynamically adapted camera frequency may be a frequency that the camera device should operate 300 on to minimize interference in the user device 100. The dynamically adapted camera frequency may include not only one frequency, but a range of frequencies as well.

In this embodiments of the present invention, the frequency adjustment component 106 may be one or more of a hardware component such as a circuit element (e.g., including transistors, resistors, capacitors, inductors, and so forth), an integrated circuit, application specific integrated circuit (ASIC), programmable logic device (PLD), digital signal processors (DSP), field programmable gate array (FPGA), logic gates, registers, semiconductor device, chips, microchips, chip sets, and so forth. Also, in other embodiments, the frequency adjustment component 106 may be a software application (e.g., stored on the user device memory component 102) as well. In this embodiment, the frequency adjustment component 106 may be a chip set. In other embodiments, the frequency adjustment component 106 may be, for example, part of a larger system on a chip (SOC).

The interconnect 200 may be a physical arrangement that facilitates electronic signals to be sent in between the frequency adjustment component 106 and the camera device 300. So, for example, the frequency adjustment component 106 may be configured to transmit, among other things, imaging information (e.g., image resolution information), control information (e.g., timing information) and information pertaining to the dynamically adapted camera frequency to the camera device 300 via the interconnect 200. Also, the camera device 300 may be configured to transmit, among other things, image data (i.e., data relating to an image captured by the camera 300) and/or control information (e.g. timing information relating to the camera device 300) to the frequency adjustment component 106 via the interconnect 200.

The camera device 300 may be any device configured to capture an image or a video feed of an object or image. In this embodiment, as shown, the camera device 300 may be integrated into the user device 100. The camera device 300 may include, among other things, an image sensor control component 301 and an image sensor 302.

The image sensor control component 301 may be a controller component configured to, among other things, control the operation of the image sensor 302. The image sensor control component 301 may be configured to receive an instruction signal (e.g., from the frequency adjustment component 106) to transmit using the dynamically adapted camera frequency. Upon receiving the instruction signal, the image sensor control component 301 may configure itself (e.g., by reconfiguring registers relating to an internal phase-lock loop) to utilize the dynamically adapted camera frequency.

The image sensor control component 301 may then cause the image sensor 302 to transmit based on that camera frequency as well. In particular, upon reconfiguring itself to implement the dynamically adapted camera frequency, the image sensor control component 301 may transmit signals over an incoming clock signal line 303 (e.g., a trace) and/or an image control signal line 304 (e.g., a trace) utilizing the dynamically adapted camera frequency. The incoming clock signal line 303 may be a clock signal that may be use to synchronize the timing of the image sensor 302 with the image sensor control component 301. The image control signal line 304 may be utilized to provide control signals pertaining to the image capture function of the image sensor 302 (e.g., image resolution instructions, frame rate instructions, etc.).

In this embodiment of the present invention, the image sensor control component 301 may be one or more of a hardware component such as a circuit element (e.g., including transistors, resistors, capacitors, inductors, and so forth), an integrated circuit, ASIC, PLD, DSP, FPGA, logic gates, registers, semiconductor device, chips, microchips, chip sets, and so forth. In other embodiments, the image sensor control component 301 may be a software application as well. In this embodiment, the image sensor control component 301 may be an ASIC.

Upon implementing the dynamically adapted camera frequency, the incoming clock signal line 303 and the image control signal 304 may cause the image sensor 302 to track to the dynamically adapted camera frequency as well. For example, the image sensor 302 may reconfigure an internal phase-lock loop utilizing the timing information (based on the dynamically adapted camera frequency) being sent in the incoming clock signal line 303 to synchronize with the image sensor control component 301.

In addition, as the operation of the image sensor 302 has been tracked to the dynamically adapted camera frequency, the transmissions over an image data signal line 305 (e.g., a trace) and an outgoing clock signal line 306 (e.g., a trace) may be synchronized according to the dynamically adapted camera frequency as well. The image data signal line 305 may be utilized to transmit image data captured by the image sensor 302 (e.g., video data). The outgoing clock signal line 306 may transmit timing information relating to the image sensor 302 (e.g., the timing information for the image data captured).

The image data captured by the image sensor 302 and the timing information relating to the image sensor 302 may be, for example, transmitted to the image sensor control component 301, which may then retransmit this information to other components of the user device 100. For example, the timing information relating to the image sensor 302 may be stored in the user device operational information 107 of the user device memory component 102.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, the camera device 300 may be integrated into the user device 100. However, this need not necessarily be the case. In other embodiments, the camera device may be a separate device that may be coupled to a user device. For example, the user device 100 may be a desktop computer with an external camera device that is coupled to the desktop computer.

Also, for example, in the embodiment described in FIG. 1, the image sensor control component 301 and the image sensor 302 may be separate. However, in other embodiments, an image sensor control component and an image sensor may be integrated together.

Figure 2:
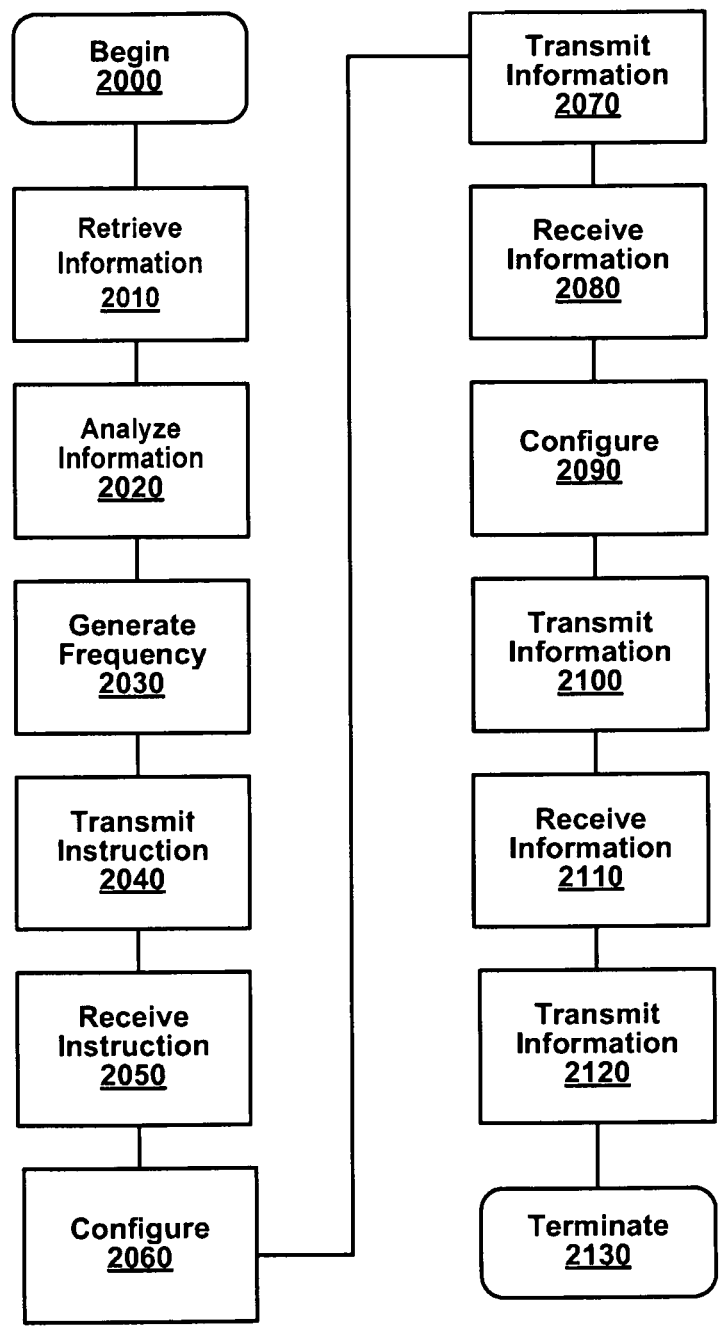
FIG. 2 is a flowchart of an example of a method of implementing dynamically adaptive frequency adjustment in accordance with an embodiment of the invention.

Turning now to FIG. 2, a flowchart of an example of a method of implementing a dynamically adaptive frequency adjustment service in accordance with an embodiment of the invention is shown. In this example, a user device, such as the user device (FIG. 1), may be configured to provide dynamic, adaptive frequency adjustment to reduce radio band interference. The user device may include three user device transceivers, such as the user device first transceiver 103 (FIG. 1), the user device second transceiver 104 (FIG.

1), the user device third transceiver 105 (FIG. 1), and a camera device, such as the camera device 300 (FIG. 1).

The method might be implemented as a set of logic instructions stored in a machine- or computer-readable storage medium such as RAM, ROM, PROM, firmware, flash memory, etc., in configurable logic such as PLAs, FPGAs, complex programmable logic devices (CPLDs), in fixed-functionality logic hardware using circuit technology such as ASIC, complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, a frequency adjustment component, such as the frequency adjustment component 106 (FIG. 1), may retrieve transmission information, such as the user device operational information 107 (FIG. 1). At processing block 2020, the frequency adjustment component may utilize a dynamically adaptive frequency algorithm, such as the dynamically adaptive frequency algorithm 108 (FIG. 1), to analyze the transmission information to determine that if the camera frequency that the camera device is operating on is not adjusted, interference in the transmission operation of one of the three transceiver devices may be imminent.

At processing block 2030, the dynamically adaptive frequency algorithm may determine a dynamically adapted camera frequency. At processing block 2040, the frequency adjustment component may transmit an instruction signal to an image sensor control component of the camera device, such as the image sensor control component 301 (FIG. 1), to instruct the frequency adjustment component that the camera device is to operate based on the dynamically adapted camera frequency. At processing block 2050, the image sensor control component may receive the instruction signal from the frequency adjustment component.

At processing block 2060, the image sensor control component may configure itself to implement the dynamically adapted camera frequency. In this example, the image sensor control component may reconfigure registers to adjust an internal phase-lock loop.

At processing block 2070, upon being configured, the image sensor control component may transmit signals based on the dynamically adapted camera frequency to an image sensor, such as the image sensor 302 (FIG. 1) over an incoming clock signal line, such as the incoming clock signal line 302 (FIG. 1), and/or an image control signal line, such as the image control signal line 304 (FIG. 1). At processing block 2080, the image sensor may receive timing information and control signals over the incoming clock signal line and the image control signal line respectively.

At processing block 2090, the image sensor may configure itself to track the frequency that the image sensor control component is using (i.e., the dynamically adapted camera frequency). At processing block 2100, the image sensor may transmit signals (utilizing the dynamically adapted camera frequency) back to the image sensor component over an image data signal line, such as the image data signal line 305 (FIG. 1), and an outgoing clock signal line, such as the outgoing clock signal line 306 (FIG. 1).

At processing block 2110, the image sensor control component may receive image data captured by the image sensor and timing information relating to the image sensor over the image data signal line and the outgoing clock signal line respectively. The timing information relating to the image sensor may indicate that the image sensor (and by extension, the outgoing clock signal line and the image data signal line) is transmitting based on the dynamically adapted camera frequency. At processing block 2120, the image sensor control component may transmit the image data captured by the image sensor and the timing information relating to the image sensor to other components in the user device (e.g., a user device memory component, a user device processing component). At processing block 2130, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the frequency adjustment component may utilize a dynamically adaptive frequency algorithm to determine a dynamically adapted camera frequency (i.e., processing block 2030) in response to a determination that interference may be imminent (i.e., processing block 2020). However, in embodiments of the present invention, this need not necessarily be the case. In other embodiments, a dynamically adaptive frequency algorithm may determine a dynamically adapted camera frequency based on any other criteria.

Embodiments may therefore provide for a method of implementing dynamically adaptive frequency adjustment, comprising receiving a first set of transmission information relating to a transmission device and receiving a second set of transmission information relating to a camera device. The method may also provide for analyzing the first set of transmission information and the second set of transmission information based on a likelihood of transmission interference and determining a dynamically adapted camera frequency, wherein the dynamically adapted camera frequency is to minimize the transmission interference.

In one example, the method may also provide for transmitting an instruction signal to the camera device to direct the camera device to transmit based on the dynamically adapted camera frequency.

In another example, the instruction signal is transmitted by a frequency adjustment component.

In another example, the frequency adjustment component may be one of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, and a software application.

In another example, the method may provide for configuring the camera device to transmit based on the dynamically adapted camera frequency.

In another example, configuring the camera device includes configuring an image sensor control component.

In yet another example, the image sensor control component may be one of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, and a software application.

In another example, the configuring the camera device includes configuring an image sensor.

In another example, the method may provide for transmitting a communication to indicate that the camera device is transmitting based on the dynamically adapted camera frequency.

Embodiments may also include at least one machine readable medium comprising a plurality of instructions that in response to being executed on a computing device, cause the computing device to carry out any of the examples of the aforementioned method. Embodiments may also provide an apparatus for implementing dynamically adaptive frequency adjustment, comprising a transceiver and logic configured to carry out any of the examples of the aforementioned method. Another embodiment may provide a system for implementing dynamically adaptive frequency adjustment, comprising a transceiver, a camera device, and logic configured to carry out any of the examples of the aforementioned method.

Another embodiment may provide for a method of implementing dynamically adaptive frequency adjustment, comprising transmitting a set of transmission information relating to a camera device, and receiving an instruction signal to direct the camera device to transmit based on a dynamically adapted camera frequency, wherein the dynamically adapted camera frequency is determined to minimize the transmission interference. The method may also provide for configuring the camera device to transmit based on the dynamically adapted camera frequency.

In another example, the configuring the camera device includes configuring an image sensor control component.

In another example, the image sensor control component is one of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, and a software application.

In yet another example, the configuring the camera device includes configuring an image sensor.

In another example, the method may provide for transmitting a communication to indicate that the camera device is transmitting based on the dynamically adapted camera frequency.

In still another example, the method may provide for transmitting a communication providing timing information to synchronize a timing of an image sensor with an image sensor control component.

In another example, the method may provide for transmitting a communication providing control signal pertaining to an image capture function of an image sensor.

In yet another example, the method may provide for receiving image data captured by an image sensor.

In another example, the method may provide for receiving timing information relating to an image sensor.

Embodiments may also include at least one machine readable medium comprising a plurality of instructions that in response to being executed on a computing device, cause the computing device to carry out any of the examples of the aforementioned method. Embodiments may also provide an apparatus for implementing dynamically adaptive frequency adjustment, comprising a transceiver and logic configured to carry out any of the examples of the aforementioned method. Another embodiment may provide a system for implementing dynamically adaptive frequency adjustment, comprising a transceiver, a camera device, and logic configured to carry out any of the examples of the aforementioned method.

Another embodiment may provide for a method of implementing dynamically adaptive frequency adjustment, comprising transmitting a set of transmission information relating to a camera device, and receiving an instruction signal to direct the camera device to transmit based on a dynamically adapted camera frequency, wherein the dynamically adapted camera frequency is determined to minimize the transmission interference. The method may also provide for configuring the camera device to transmit based on the dynamically adapted camera frequency.

Yet another embodiment may provide at least one computer readable storage medium comprising a set of instructions which, if executed by a processor, cause a computer to receive a first set of transmission information relating to a transmission device and receive a second set of transmission information relating to a camera device. The set of instructions may also cause a computer to analyze the first set of transmission information and the second set of transmission information based on a likelihood of transmission interference and determine a dynamically adapted camera frequency, wherein the dynamically adapted camera frequency is to minimize the transmission interference.

Another embodiment may provide for a computer readable storage medium comprising a set of instructions which, if executed by a processor, cause a computer to transmit a set of transmission information relating to a camera device. The set of instructions may also cause a computer to receive an instruction signal to direct the camera device to transmit based on a dynamically adapted camera frequency, wherein the dynamically adapted camera frequency is determined to minimize the transmission interference and configure the camera device to transmit based on the dynamically adapted camera frequency.

Another embodiment may provide an apparatus comprising a processing component and a transmission device. The apparatus may also include a first transmission module to receive a first set of transmission information relating to a transmission device and a second transmission module to receive a second set of transmission information relating to a camera device. The apparatus may further include an analysis module to analyze the first set of transmission information and the second set of transmission information based on a likelihood of transmission interference and a frequency module to generate a dynamically adapted camera frequency, wherein the dynamically adapted camera frequency is to minimize the transmission interference.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other, components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method of implementing dynamically adaptive frequency adjustment, comprising:
  receiving a first set of transmission information relating to at least one of a plurality of transmission devices;
  receiving a second set of transmission information relating to a camera device;
  analyzing the first set of transmission information and the second set of transmission information based on a likelihood of transmission interference;
  determining a dynamically adapted camera frequency, wherein the dynamically adapted camera frequency is to minimize the transmission interference; and
  transmitting an instruction signal to the camera device to direct the camera device to transmit based on the dynamically adapted camera frequency,
  wherein the instruction signal is transmitted by a frequency adjustment component that adjusts an image resolution.

2. The method of claim 1, wherein the frequency adjustment component is one of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, or a software application.

3. The method of claim 1, including configuring the camera device to transmit based on the dynamically adapted camera frequency.

4. The method of claim 3, wherein the configuring the camera device includes configuring an image sensor control component to vary one or more of an image resolution or a frequency of image capture.

5. The method of claim 4, wherein the image sensor control component is one or more of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, or a software application.

6. The method of claim 3, wherein the configuring the camera device includes configuring an image sensor.

7. The method of claim 1, including transmitting a communication to indicate that the camera device is transmitting based on the dynamically adapted camera frequency.

8. At least one non-transitory machine readable medium comprising a plurality of instructions for implementing dynamically adaptive frequency adjustment that in response to being executed on a computing device, cause the computing device to carry out a method according to claim 1.

9. An apparatus to implement dynamically adaptive frequency adjustment, comprising:
  a transceiver; and
  logic configured to perform the method of claim 1.

10. A system to implement dynamically adaptive frequency adjustment, comprising:
  a transceiver;
  a camera device; and
  logic configured to perform the method of claim 1.

11. A method of implementing dynamically adaptive frequency adjustment, comprising:
  transmitting a set of transmission information relating to a camera device;
  receiving an instruction signal to direct the camera device to transmit based on a dynamically adapted camera frequency, wherein the dynamically adapted camera frequency is determined to minimize transmission interference with respect to at least one of a plurality of transmission devices; and
  configuring the camera device to transmit based on the dynamically adapted camera frequency,
  wherein the instruction signal is transmitted by a frequency adjustment component that adjusts an image resolution.

12. The method of claim 11, wherein the configuring the camera device includes configuring an image sensor control component.

13. The method of claim 12, wherein the image sensor control component is one or more of a circuit element, an integrated circuit, an application specific integrated circuit (ASIC), a programmable logic device (PLD), a digital signal processors (DSP), a field programmable gate array (FPGA), a logic gate, a register, a semiconductor device, a chip, a microchip, a chip set, or a software application.

14. The method of claim 11, wherein the configuring the camera device includes configuring an image sensor.

15. The method of claim 11, including transmitting a communication to indicate that the camera device is transmitting based on the dynamically adapted camera frequency.

16. The method of claim 11, including transmitting a communication providing timing information to synchronize a timing of an image sensor with an image sensor control component.

17. The method of claim 11, including transmitting a communication providing a control signal pertaining to an image capture function of an image sensor.

18. The method of claim 11, including receiving image data captured by an image sensor.

19. The method of claim 11, including receiving timing information relating to an image sensor.

20. At least one non-transitory machine readable medium comprising a plurality of instructions for implementing dynamically adaptive frequency adjustment that in response to being executed on a computing device, cause the computing device to carry out a method according to claim 11.

21. An apparatus to implement dynamically adaptive frequency adjustment, comprising:
  a transceiver; and
  logic configured to perform the method of claim 11.

22. A system to implement dynamically adaptive frequency adjustment, comprising:
  a transceiver;
  a camera device; and
  logic configured to perform the method of claim 11.

* * * * *